United States Patent [19]

Bodlaj

[11] 4,053,227

[45] * Oct. 11, 1977

[54] METHOD AND APPARATUS FOR AUTOMATIC AND CONTACTLESS MEASUREMENT OF THE HEIGHT OF MOVING BLADES OF A TURBINE

[75] Inventor: Viktor Bodlaj, Munich, Germany

[73] Assignee: Siemens Aktiengesellschaft, Berlin & Munich, Germany

[*] Notice: The portion of the term of this patent subsequent to Dec. 2, 1992, has been disclaimed.

[21] Appl. No.: 619,489

[22] Filed: Oct. 3, 1975

[30] Foreign Application Priority Data

Oct. 7, 1974  Germany ............................ 2448219

[51] Int. Cl.² .............................................. G01C 3/08
[52] U.S. Cl. .......................................... 356/4; 356/1; 356/5; 356/24
[58] Field of Search ........................................ 356/3–5, 356/24–26, 156, 167; 250/224; 73/171.3, 455, 457

[56] References Cited

U.S. PATENT DOCUMENTS

| | | | |
|---|---|---|---|
| 2,827,823 | 3/1958 | Shurcliff | 356/25 |
| 2,964,849 | 12/1960 | Roccati | 356/25 |
| 3,692,414 | 9/1972 | Hosterman et al. | 356/4 |
| 3,856,410 | 12/1974 | Swift et al. | 356/167 |
| 3,923,395 | 12/1975 | Bodlaj | 356/4 |

Primary Examiner—John K. Corbin
Assistant Examiner—Wm. H. Punter
Attorney, Agent, or Firm—Hill, Gross, Simpson, Van Santen, Steadman, Chiara & Simpson

[57] ABSTRACT

A method and apparatus for measuring the height of a blade of a turbine rotor as the rotor is being rotated characterized by deflecting a laser beam at a given deflection frequency across the path of the moving blade so that a portion of the deflected beam will be reflected by the end of the blade, sensing the reflected portion to produce a reflected signal, synchronizing the speed of rotation of the rotor with the frequency of deflection so that the end of the blade and the deflected beam reach the same point simultaneously and applying the reflected laser signal and a reference signal from the laser beam to an electronic analysis system to determine the height of the individual blade. Preferably, the synchronizing is accomplished by sensing the blade frequency, converting it to a converted blade frequency, comparing the converted blade frequency with the frequency of deflection to obtain an error signal and using the error signal to control the speed of rotation of the rotor. By including a counter circuit in the electronic analysis circuit and by sensing a mark on the rotor during each rotation of the rotor, adjustments can be made to either determine the height of each blade in a stage of blades during one revolution or to determine the height of a single individual blade of the stage.

8 Claims, 6 Drawing Figures

METHOD AND APPARATUS FOR AUTOMATIC AND CONTACTLESS MEASUREMENT OF THE HEIGHT OF MOVING BLADES OF A TURBINE

BACKGROUND OF THE INVENTION

1. Field of the Invention

The present invention is directed to a method and apparatus for measuring the height of a blade of a turbine rotor as the rotor is being rotated and without any contact taking place.

2. Prior Art

Since the position of blades on a rotor such as a gas/steam turbine, compressor or the like is acted on by the action of centrifugal force, and since tight tolerances are involved, it is desirable to measure the radial height of the blade while the rotor is in operation. Heretofore, it was only possible to manually measure the radial height of each individual blade and this could only be accomplished with the rotor being stationary following the positioning of the blades by operating the rotor.

SUMMARY OF THE INVENTION

The object of the present invention is to provide a method and apparatus for measuring the blade heights in a contactless fashion, in rapid succession and with a short measuring time. To obtain these tasks, the method and apparatus comprises rotating the turbine rotor having the blades arranged thereon, deflecting a laser beam from a given path at a known frequency of deflection to move the deflected beam across the path of the moving blade to have a portion of the beam reflected from an end of the blade, sensing a portion of the beam reflected from the end of the blade to obtain a reflected signal, synchronizing the speed of rotation of the rotor with the frequency of deflection so that the end of the blade and the deflected beam reach the same point simultaneously, and applying the reflected signal and a reference signal from the beam to an electronic analysis system to determine the height of the individual blade. Preferably, the synchronizing is accomplished by sensing the blade passing a given point during rotation of the rotor to obtain a blade frequency, converting the blade frequency to a converted blade frequency, comparing the converted blade frequency with the deflection frequency to obtain an error signal and adjusting the speed of rotation of the rotor in response to the error signal. By providing the electronic analysis system with a counting circuit, and by sensing a mark on the rotor during each revolution to create a starting signal, applying the starting signal to the counting circuit, the height of either an individual blade of each stage can be measured during each revolution of the rotor or all of the blades of the stage can be measured.

DESCRIPTION OF THE PREFERRED EMBODIMENT

Figure 1:
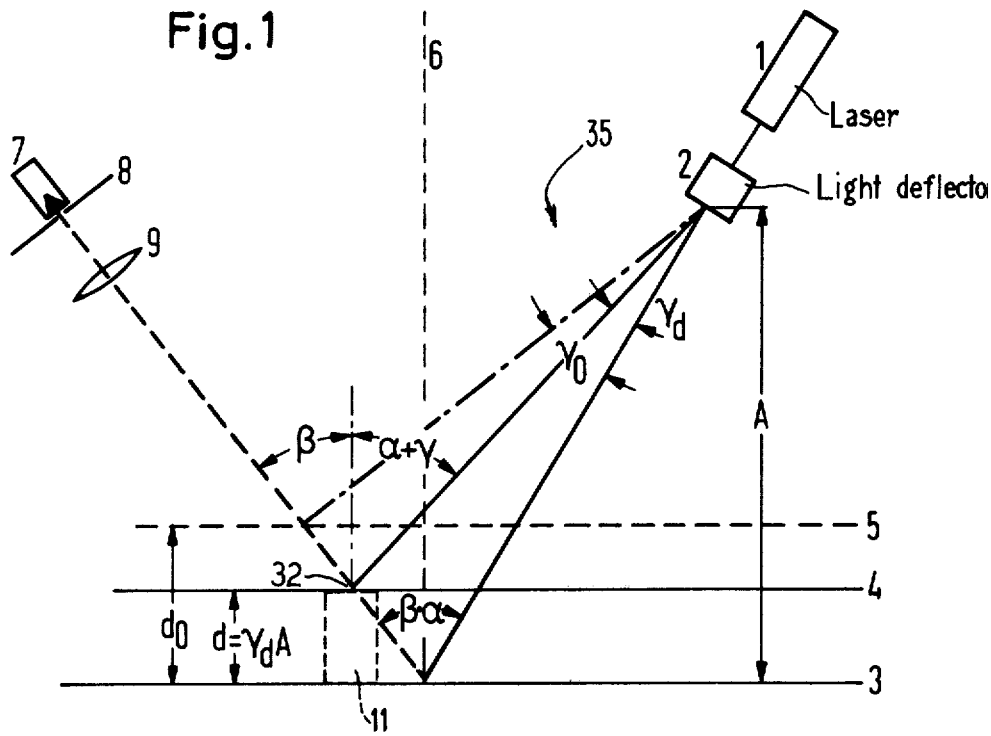
FIG. 1 is a schematic illustration of a device for implementing the method of the present invention.
Figure 5:
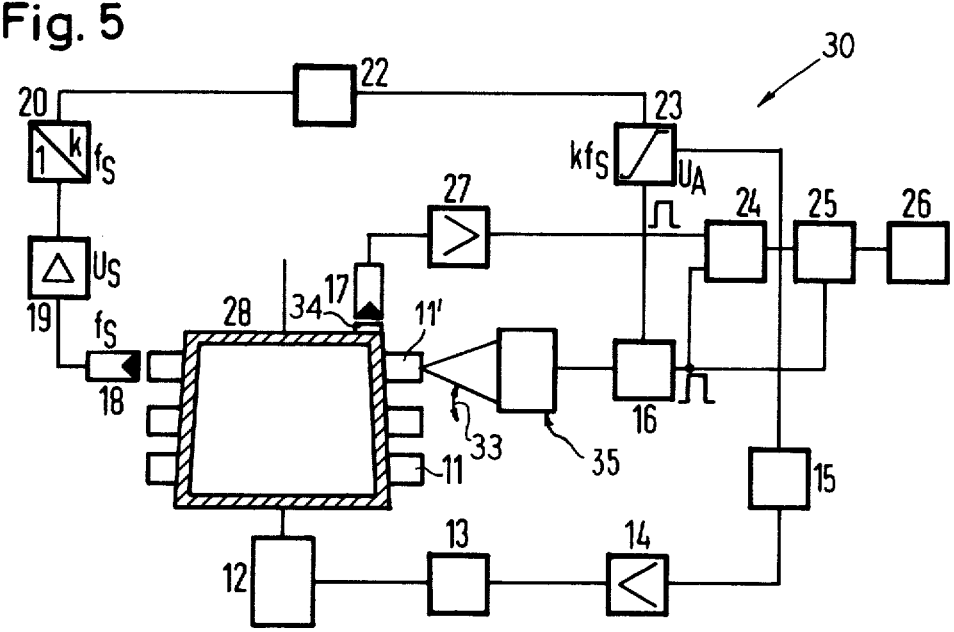
FIG. 5 is a block circuit diagram of the overall measuring apparatus in accordance with the present invention.

The principles of the present invention are particularly useful when incorporated in a measuring apparatus generally indicated at 30 in FIG. 5. The apparatus 30 includes an optical light projecting and detecting device 35 which is best illustrated in FIG. 1.

The device 35 includes a coherent light source such as a laser 1 which produces a laser beam 10 which is deflected by a light deflector 2 in a path extending across the path of movement of a blade 11. When the light deflector 2 is not deflecting the beam 10, it strikes a zero plane 3. During deflection of the beam it moves to a measuring plane 4 with the maximum amount of deflection indicated by the plane 5. The laser beam when striking the end of the blade 11 makes an angle $\beta$ with a reference vertical line 6 and the reflected portion of the beam is directed by a lens 9 through an opening or aperture in a diaphragm 8 to a photo detector 7.

If a height of each individual blade 11 of a rotor 28 (FIG. 5) is to be measured, then the turbine must maintain the following speed:

$$n = f_A/(m \cdot 60) \tag{1}$$

wherein $f_A$ is the deflection frequency of the laser beam deflector 2 which may be for example a piezoelectric deflecting device, $m$ is the number of blades in a stage of the turbine rotor, and $n$ is the turbine speed (rpm).

If an induction pick-up or a light sensor is used to produce a pulse in respect to each turbine blade 11, 21, 31, 41 of a stage of the rotor which blades pass a specific spatial point, then a pulse voltage $U_s$ of a frequency $$f_s = nm/60 \tag{2}$$

is obtained. Frequency $f_s$ is the blade frequency.

In order to be able to measure each blade of a stage of blades, the following condition must be satisfied $$f_s = f_A/k \tag{3}$$

where $k$ is a whole number and equal to 1, 2, 3 . . . .

Assuming that an infinite thin laser beam is deflected in a plane extending parallel to the axis of rotation of the rotor 28, the time available to measure each blade is only $$t_s = d_s/v_u \tag{4}$$

where $d_s$ is the blade thickness and $v_u$ is the speed of rotation at the end of the blade and $$v_u = (n \pi D_R)/60 \tag{5}$$

$D_R$ is the overall diameter of the turbine rotor. The measurement time required for the formation of the measuring pulse $U_M$ in the photo diode 7 is $$t_D = s_b/v_D \tag{6}$$

where $s_b$ is the slot width of the aperture of the diaphragm 8 and $v_D$ is the speed with which the reflected laser beam light spot moves over or across the photo diode 7.

Figure 2:
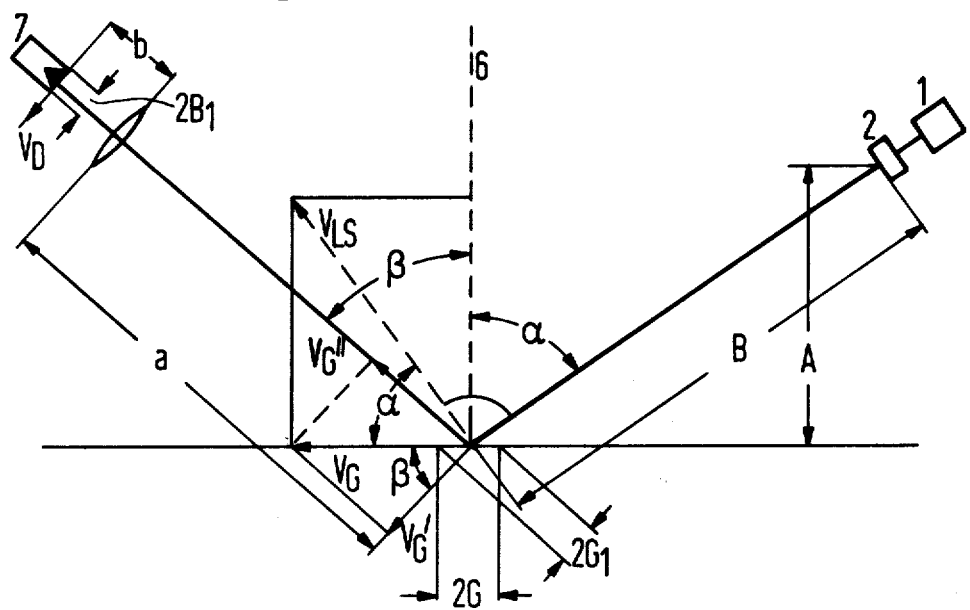
FIG. 2 illustrates the path being used to determine the projection rates.

We thus have the relationship:

$$v_D = 4 f_A \gamma_o A (b/a) \cos \beta \tag{7}$$

where:

γ₀ is the maxiumm deflection of the laser beam; $A$ is the interval between the zero plane 3 and laser beam deflector 2;

$a$ is the interval between the lens 9 and the spot line width 2 $G_1$ (FIG. 2);

$b$ is the interval between lens 9 and the line spot 2 $B_1$; and $\beta$ is the reflection angle (FIG. 2).

The measurement time $t_D$ required to form the measuring pulse $U_M$ must be shorter than the time $t_s$ for which the blade is located in the laser beam.

$$t_D < t_s \quad (8)$$

If the laser beam is assumed to be infinitely thin and if the beam is intended with each new deflection in all cases to scan the next blade of the stage in succession, then during the periodic deflection, the interval 1 between the individual blades 11, 21, 31, 41 (FIG. 3) must differ at most by a blade thickness $d_n$ with $n = 1, 2, 3$...

$$I_n - I_{n+1} > d_s \quad (9)$$

Figure 4:
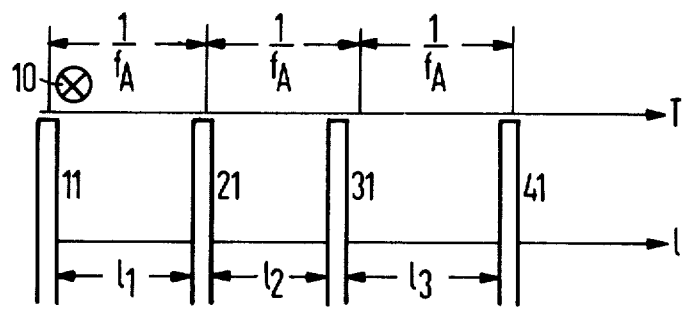

Because the condition of equation 9 cannot always be fulfilled in practice, the laser beam diameter $d_L$ must be increased to the expected blade interval error (FIG. 4).

$$d_L > I_n - I_{n+1} \quad (10)$$

with $n = 1, 2, 3 \ldots$

Figure 3:
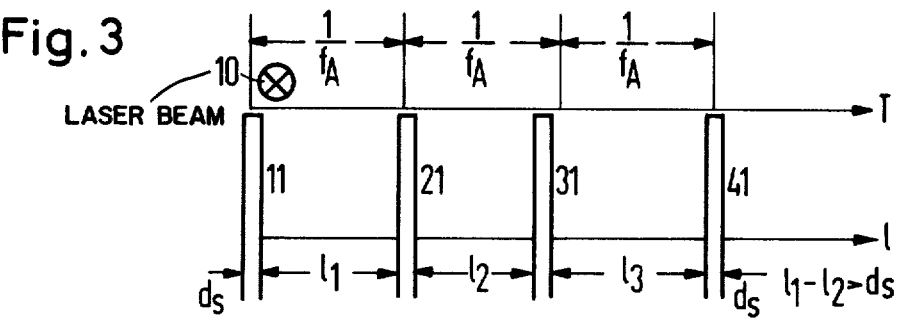
FIG. 3 and 4 illustrate the relationship between the laser beam diameter and the blade interval.

FIG. 3 illustrates that with a laser beam diameter $d_L$ being small, the blade 31 cannot be scanned using periodic scanning by the laser beam 10 because the difference in the distance is $I_1 - I_2 > d_L$. Since the interval between blade 31 and blades 21 and 41 is greater than the diameter of the laser beam 10, the diameter of the laser beam 10 is increased to $d_L > I_n - I_{n+1}$. With the increased diameter, the laser beam will also strike the blade 31 so that it too can be measured. For a reliable measurement of the individual blades, both equations 3 and 10 must be satisfied.

As illustrated in FIG. 5, the laser beam 10 is deflected substantially in plane of the drawing in the direction of arrow 33 to move across the path of the stage of rotating blades containing the blade 11'. In order to obtain a measurement of the height of the blade 11', the tip or end of the blade 11' must simultaneously reach the same point as the deflected laser beam 10 and this point is on the axis of the imaging optic system and is illustrated as point 32 in FIG. 1.

In order to obtain the simultaneous reaching of the beam 10 and the end of the blade 11 at the axis of the optic system, the condition of equation 3 ($f_A = k f_s$) must be continually checked and maintained by using a control circuit diagrammatically illustrated in FIG. 5. In this control circuit, the blade frequency $f_s$, which is a function of the number $m$ of blades in the stage and the speed of rotation $v_u$, is determined by means of a sensing device 18 which may be an induction pick-up or a light sensing device. The device 18 produces a signal $U_s$ of the blade frequency $f_s$ and this signal is amplified in an amplifier 19 and then applied to a frequency converter 20. In the frequency converter 20, the blade frequency $f_s$ is converted to the deflection frequency $f_A$. The ratio $f_A : f_s$ if $f_s < f_A$ or $f_s : f_A$ if $f_s > f_A$ must in all cases be a whole number $k$ with $k = 1,2,3,4 \ldots$. From the converter 20, the converted frequency which is $k f_s$ is passed through a phase correcting element 22 which may be used to adjust the scanning time interval of the laser beam 10. The set phase 6 and the frequency $f_s$ are compared in a phase discriminator 23 with a deflection control signal of the frequency $f_A$, which is provided from an electronic analyzing system 16.

If a change in the set value occurs as a consequence of changes in the speed of the rotor 28, then an error signal as an output of the low-pass filter 15 will occur. This output or error signal may be a positive or a negative direction voltage signal with the polarity of the voltage depending upon whether the desired speed of the rotor has been exceeded or undershot. The speed criterion can be used to regulate the speed of the drive motor 12 for the rotor 28. The signal $V_R$ is amplified in a variable gain amplifier 14 to a level required in the motor rpm controller 13 and is applied to the motor 12 to synchronize the blade frequency of the rotor 28 with the deflection frequency of the laser beam.

The measurement of the blade such as 11' is accomplished by applying a reference pulse $U_B$ of the laser beam and a measurement or reflected signal pulse $U_M$ to the electronic analyzing system 16 which analyzes the two pulses and creates a measurement value pulse. The pulse duration of the measurement value pulse will depend upon the time interval between the reference pulse $U_B$ and the reflected signal pulse $U_M$ and this pulse duration is an indication of the radial height of the blade such as 11'.

Since there are a plurality of blades in each stage of the rotor 28, it is desirable to be either able to selectively measure a given blade in the stage or all of the blades in the stage. After each revolution of the rotor 28, a renewed measurement of the blades can take place when the blade frequency is a whole number multiple lower or higher than the deflection frequency of the laser beam. In order to accomplish this, a counting of the number of repetitions can be recorded by using a mark 34 on the rotor 28 which mark is sensed by sensing device 17 which may be either a light sensing device or an induction sensing device. With each revolution, a starting signal is received by the device 17 which is amplified in an amplifier 27 and applied to a counting circuit 24. By using the starting signal from the sensor 17, counting and/or the number of repetitions of the passage of the blades can be determined. If with each revolution, it is required to deal with only one blade of the stage, then this can be done using the counting circuit 24. After each revolution, the counting circuit is restarted by the starting pulse created by sensing the mark 34. From an adjustment of the counting circuit 24, it can be determined from which blade the measured value pulse in a converting means 25 such as a pulse data converter is based on. When the counter indicates that the value for the desired blade is received in the converter, the converter will convert the measure pulse value for the selected blade into an indication on a display such as 26. Measurement of only one blade per rovolution imposes less stringent demands upon the indicating instruments and the figures for the blade on which the measurement is being carried out can be average satisfactory after only a few repetitions.

While the above was described by measuring only a single blade in each stage, the counter can be adjusted to enable displaying on the display 26 the height or measurements for each of the blades in the stage. With this adjustment, the counter will indicate when a complete revolution is accomplished and when a repeating of the measurements are beiang received.

As mentioned hereinabove, the electronic analyzer 16 obtains a pulse value which is dependent on a reference signal from the laser beam and the measured signal from the reflected light. A block circuit diagram of the analyzer 16 is illustrated in FIG. 6 and includes a block circuit diagram for converting the measured pulse value into a height measurement which will be indicated on a display and includes control circuit for maintaining the deflection frequency.

Figure 6:
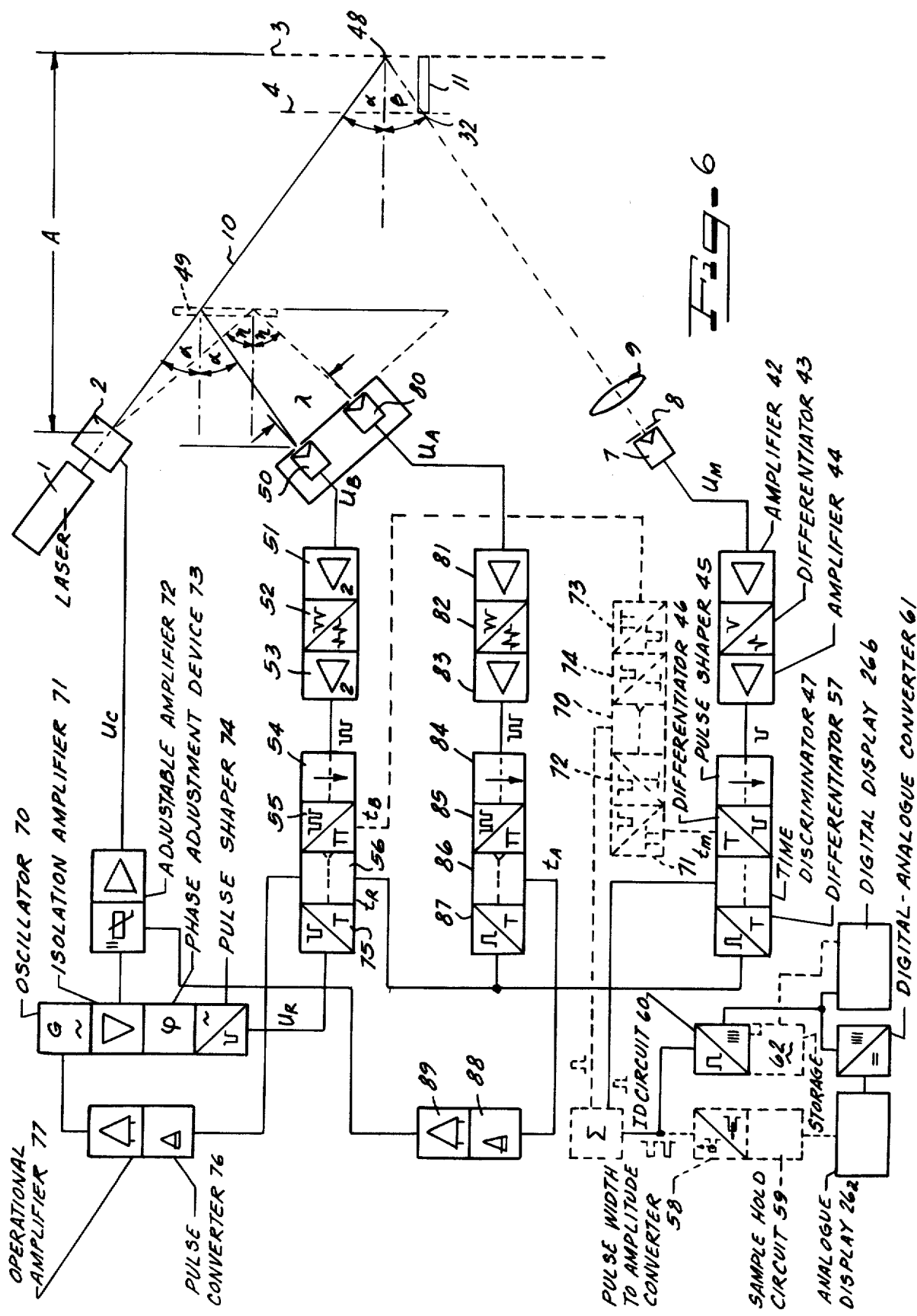
FIG. 6 is a block circuit diagram of the electronic and optical system utilized for analyzing signals obtained.

As illustrated in FIG. 6, when the beam 10 is deflected by the deflector 2 to strike the measuring point 32 on the tip or end of a blade 11, the light is reflected and received by the lens 9 and projected through the aperture of the diaphragm 8 onto the photo diode 7. When light strikes the photo diode 7, a measuring pulse $U_M$ is created and is amplified to a certain value in an amplitude-stabilizing amplifier 42. The amplified pulse is then differentiated in a differentiator 43. The positive portion of differentiated signal is strongly amplified in a second amplifier 44 that amplitude limits in order to obtain the most rectangular pulse possible. This pulse is then converted in a pulse shaper 45, such as a flip-flop, into a pulse which has very short build-up and decay times so that after differentiation in a second differentiator 46 very short needle pulses are obtained. The build-up time of the needle pulse is used to determine the measuring time instant $t_M$ which corresponds to the instant at which the deflected laser beam 10 has reached the measuring point 32 on the measuring plane such as 4. The needle pulse is then applied to one side of a time discriminator 47.

In order to determine the time delay between the initiating of the sweep or deflection of the laser beam 10 and the time of receiving the measuring pulse $U_M$, a reference time must be compared with the measured time $t_M$. While the reference time could be achieved by the initiation of the deflection cycle of the beam deflector 2, or could be received by the beam detected as the beam hits a zero point 48 on the zero plane 3, the circuit diagram uses a reference plane or virtual zero plane which is formed by a glass plate 49 so that the zero time pulse of the undeflected laser beam is not obstructed by objects being measured such as the blades in adjacent stages of the rotor 28 of FIG. 5.

Since the glase plate which forms the virtual zero plane has two reflecting surfaces which are spaced apart a given distance the laser beam 10 will be twice reflected with sufficient energy to create two closely spaced pulses of reflected light. When the beam 10 at a zero deflection strikes the glass plate 49, a photo detector 50 will receive the two light pulses and create a pair of reference pulses $U_B$ which are passed through a first amplitude stabilizing amplifier 51, a differentiator 52, to a second amplifier 53 in a manner similar to the processing of the measured pulse $U_M$. The two pulses that are amplified in the amplifier 53 are then applied to a pulse shaper 54 and then to a differentiator 55 which has an output to a time discriminator 56 which has one output connected to a differentiator 57. The time discriminator 56 and the differentiator 57 will select only one of the two needle pulses for the zero plane which pulse must always be from the same surface of plate 49. This selected needle pulse is $t_B$ and represents the reference signal or time and is applied to the oposite side of the time discriminator 47.

The time discriminator 47 which receives the time needle pulses of the $t_B$ and $t_M$ produces a measured value of a duration $\Delta t_D = t_M - t_B$. When the difference between the angle $\alpha$ of incidence of the laser beam on the zero plane and angle $\beta$ the angle of reflection of the light on the point 32 are small and the angles $\alpha$ and $\beta$ are approximately 45°, the height or measured distance of the blade is proportional to duration $\Delta t_D$.

The evaluation of the pulse duration $\Delta t_D$ of the measured value pulse from the time discriminator 47 and its display can be accomplished in various ways. An example is that the measured value pulse can be simply converted into a direct voltage proportional to the pulse duration by means of an RC low-pass integrating member. In order to keep the voltage surge small, integration must take place via very many measurememt value pulses or respectively the RC constant must be selected very large. The direct voltage obtained in this way is suitable for analogue display such as one retating coiled instrumemt or graphic recorders. Measurement accuracy will depend on the pulse-fluctuation and the residual surge of the integrated measured value pulse. Since the measurement speed is considerably reduced because of the RC constant, this type of pulse duration evaluation is only suitable for small measuring speeds from 1 to 5 measurements per second.

Another type of evaluation of the measured value pulse exploits the measurement speed occurring as a result of the laser deflection frequency. In this evaluation the pulse duration which depends on the height of the blade is converted into a height dependent pulse in a pulse width to amplitude converter 58 (illustrated in broken lines) which coacts with a sample and hold circuit 59. The amplitude of each of the converted pulse corresponds to the measured height and is an analogue. The amplitude of the pulse can be displayed on a display device such as 26a. When a large number of measurements occur, a counter circuit can activate the sample and hold device 59 to obtain the measurememt for the desired blade.

Another means of converting the measured pulse value into a displayable signal for a display device comprises applying it to and ID circuit 60 which will digitalize the measured value pulse with a scanning frequency which is higher than the deflection frequency of the laser beam. After digitalizing the measured value pulse in the circuit 60, it may be displayed on a digital display 26b or be applied to a digital-analogue converter 61 with the output applied to the analogue display 26a. If due to high measurement speeds and quick meansurment sequence in a given time the information cannot be directly displayed, the measurement values can be initially stored in a storage circuit 62 for subsequent display such as by a printer.

The measurement speed correpsonds to the inflection frequency. Since the time discriminator such as 47 can only evaluate one measurement within a deflection period, only one deflection direction for each period is used. However, the return of the deflection laser beam can also be used to obtain a measurement if a time discriminator 70 illustrated in broken lines which is in conjunction with an editing circuit. The time $t_M$ from the differentiator 46 is directed through a differentiator 71 to a second differentiator 72 to one side of the time discriminator 70. The time $t_B$ is passed from the differentiator 55 through a differentiator 73 to a subsequent differentiator 74 to be applied to the opposite side of the time discriminator 70 The output of the time discriminator 70 is then applied to the measured pulse converters to obtain a data display which may be either analogue or digital. With the application of the signals during the reverse movement of the beam, two measurements can be made during each deflection period of the laser beam. For example with a deflection frequency of 410 Hz, the measurement speed is 820 measurements per second.

As mentioned above, the laser beam deflector 2 is preferably a piezoelectric laser beam deflector. Such a deflector will achieve large deflection angles when it is operating in self resonance. The relative high resonance quality of the deflector however will bring out a steep phase alteration between a control voltage $U_C$ and the angle of deflection. Since the resonance frequency of the deflector will depend not only on internal mechanical friction but also on the temperature of the device, the deflector must be held in resonance by means of a control device and by stabilizing the phase value.

As illustrated in FIG. 6, the electronic analyzing system includes inputs which are used by means to control the resonance frequency and by means to control the speed of the deflection frequency. As illustrated, a control voltage $U_C$ is generated in an oscillator 70 which is amplified in an isolation amplifier 71 which has an output connected to an adjustable amplifier unit 72 and a second output connected to a phase adjustmemnt device 73. The phase adjustment device 73 has an output to a pulse shaper 74 whose output is directed to a differentiator 75 which creates a needle for time $t_R$ which is applied to one side of the time discriminator 56. The time discriminator 56 will create a pulse length dependent from the time lapse between time $t_B$ and the time $t_R$. This pulse from the time discriminator 56 is applied to a means 76 which converts the pulse to a pulse length dependent direct voltage and applies it to one side of an operational amplifier 77, which also receives a reference voltage to produce an error signal which is applied for controlling the oscillator 70.

In additon to stabilizing the deflection frequency, the speed of deflection must be the same in order to obtain the correct measurements. To accomplish this, a sensor such as a photo-electric diode 80 is arranged to receive the reflected beam after the laser beam 10 has been deflected through a given distance (angle). A signal $U_A$ generated by the receiving of the reflected beam in the photo diode 80 is processed similar to the signal $U_B$ by being applied through an amplitude stabilizing amplifier 81, a differentiator 82, a second amplifier 83, a pulse shaper 84, a differentiator 85 whose output time $t_A$ is connected to one side of a time discriminator 86. The other side of the time discriminator 86 receives a signal from the time discriminator 56 via a differentiator 87 and produces a pulse having a pulse width or duration dependent on the difference between the time $t_B$ and the time $t_A$. It should be noted as in the discussion regarding the obtaining of the pulse $t_B$ the two closely spaced pulses are obtained due to the double reflection caused by the surfaces of the glass plate and that the time discriminator and differentiators 85 and 86 will remove the undesired pulse. The pulse duration which is dependent on the time difference or interval betweeen times $t_A$ and $t_B$ is applied to a converting means 88 which converts it to a pulse length dependent direct voltage which is applied to one side of an operational amplifier 89 which also receives a reference voltage and produces an error signal. This error signal is applied to the adjustable amplifier 72 to vary the output control voltage of the diflector in response to sensed charges in the speed of movement of the beam along the deflected path.

It is noted that the output or the control voltage as mentioned hereinabove, is utilized in the comparator 23 (FIG. 5) and this can be obtained either from the deflector device 2 or the output of the amplifier 72.

Although various minor modifications may be suggested by those versed in the art, it should be understood that I wish to employ within the scope of the patent granted hereon, all such modifications as reasonably and properly come within the scope of my contribution to the art.

I claim:

1. A method for automatic, contactless measurement of the height of individual blades on a rotating turbine rotor comprising rotating the turbine rotor having the blades arranged thereon, deflecting a laser beam from a given path at a known frequency of deflection to move the deflected beam across the path of the moving blade to have a portion of the beam reflected from an end of the blade, sensing the portion of the beam reflected from the end of the blade to create a reflected signal, sychronizing the speed of rotation of the rotor with the frequency of deflection so that the end of the blade and deflected beam reach the same point simultaneously, and applying the reflected signal and a reference signal from the beam to an electronic analysis system to determine the height of the individual blade.

2. A method according to claim 1, wherein the analyzing system includes a counter circuit and means for converting a measured pulse into a measurement and wherein the method includes sensing the passing of a mark on the rotor during each revolution thereof to obtain a starting signal, and applying the starting signal to start the counting circuit so that the height of each blade in a stage of blades passing beneath the deflected laser beam during one revolution of the rotor is measured.

3. A method according to claim 1, wherein the electronic analyzing system includes a counter circuit and means for converting a measured value pulse into a measurement and wherein the method includes adjusting the counting circuit to enable display of the measurement of a particular blade in a stage of blades of the turbine rotor during each revolution, sensing the beginning of a revolution to obtain a starting signal and applying the starting signal to the counting circuit, so that only the height of a single individual blade is measured during each revolution of the rotor 4. A method according to claim 1, wherein the step of synchronizing includes sensing the blades passing a given point during rotation of the turbine rotor to obtain a blade frequency, converting the blade frequency to a converted blade frequency, comparing the converted blade frequency with the deflection frequency to obtain an error signal and adjusting the speed of rotation of the rotor in response to the error signal.

5. A method according to claim 4, wherein the analyzing system includes a counter circuit and means for converting a measured value pulse into a measurement, and wherein the method includes sensing the passing of a mark on the rotor during each revolution thereof to obtain a starting signal, and applying the starting signal to start the counting circuit so that the height of each blade in a stage of blades passing beneath the deflected laser beam during one revolution of the rotor is measured.

6. A method according to claim 4, wherein the electronic analyzing system includes a counter circuit and means for converting a measured value pulse into a measurement, and wherein the method includes adjusting the counter circuit to enable display of the measurement of a particlar blade in a stage of blades of the rotor during each revolution, sensing the beginning of a revolution to obtain a starting signal, and applying the starting signal to the counting circuit so that only the height of a single individual blade is measured during each revolution of the rotor.

7. An apparatus for measuring the height of individual blades of a stage of blades of a rotating turbine rotor, comprising means for rotating the rotor, a laser projecting a laser beam, means for obtaining a reference signal from the laser beam, means for deflecting the laser beam across the path of moving blades at a given frequency of deflection, means sensing a portion of the deflected laser beam reflected by an end of the blade to obtain a reflected signal, means synchronizing the speed of rotation of the rotor and a deflecting frequency so that the deflected beam and end of the blade reach the same point simultaneously, and means analyzing the reflected signal and the reference signal to determine the height of the individual blade.

8. An apparatus according to claim 7, wherein the means for synchronizing includes means sensing the blade frequency, means converting the sensed blade frequency to a converted blade frequency, means comparing the converted blade frequency with the frequency of deflection to produce an error signal, and means applying the error signal to the means for rotating the rotor to change the speed of rotation in response to the error signal.

* * * * *